C. H. BEACH.
ANTIFRICTION BEARING.
APPLICATION FILED AUG. 1, 1917.

1,255,378.

Patented Feb. 5, 1918.

WITNESS:
Leonard W. Novander.

INVENTOR.
Chester H. Beach
BY
George Bayard Jones,
ATTORNEY

UNITED STATES PATENT OFFICE.

CHESTER H. BEACH, OF RACINE, WISCONSIN, ASSIGNOR TO WISCONSIN ELECTRIC COMPANY, OF RACINE, WISCONSIN, A CORPORATION OF WISCONSIN.

ANTIFRICTION-BEARING.

1,255,378.　　　　　Specification of Letters Patent.　　Patented Feb. 5, 1918.

Application filed August 1, 1917. Serial No. 183,827.

*To all whom it may concern:*

Be it known that I, CHESTER H. BEACH, a citizen of the United States, residing at Racine, in the county of Racine and State of Wisconsin, have invented a certain new and useful Improvement in Antifriction-Bearings, of which the following is a full, clear, concise, and exact description.

This invention relates to the mounting of bearings comprising inner and outer race-ways having balls or rollers interposed therebetween, this structure being hereinafter referred to as a unitary structure.

The common method of mounting bearings of this type is to fit the inner race-way of the unitary structure snugly about the shaft to be supported and then to fit the outer race-way of said structure into a suitable housing, this latter fit being what is commonly termed a "sucking" fit, that is, one wherein the outer race-way frictionally engages the housing but is permitted to creep slightly therein in the direction of rotation and to also move longitudinally thereof with the shaft to compensate for thrusts encountered thereby.

In certain high speed machinery such as high speed portable grinders and other high speed electrical tools this creeping of the outer race-way within the housing has been found to be objectionable. It is therefore the object of the present invention to overcome this objectionable feature and to provide means whereby the outer race-way of the unitary structure is prevented from creeping in a rotary direction within the housing, but is permitted to have a slight thrust movement therein, longitudinally with the shaft, which longitudinal movement is very essential in bearings of this type.

Other objects and advantages will be apparent from the following description taken in connection with the accompanying drawings wherein the preferred embodiment of the invention is illustrated:

Figure 2:
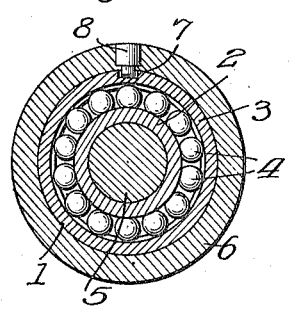
Fig. 2 is a vertical transverse sectional view thereof.

Referring more in detail to the drawings, the unitary structure is illustrated at 1 and is shown comprising the usual inner and outer race-ways 2 and 3 and the interposed bearings 4. The shaft is indicated at 5, said shaft being snugly fitted within the inner race-way 2 which is adapted to rotate therewith. The housing for the unitary structure is illustrated at 6, the outer race-way 3 having, as above pointed out, a "sucking" fit, within said housing. The housing 6 is shown in the form of a tubular member, the end of which is provided with a suitable cap 6' designed to keep dust, grit and other foreign substances from contact with said bearing, said cap being spaced slightly away from said bearing, substantially as shown, in order to provide means whereby the outer race-way 3 thereof may have a slight thrust movement within said housing. As a means, however, of preventing the outer race-way from creeping in a rotary direction within the housing as the shaft revolves, said outer race-way is provided with a suitable slot 7 adapted to receive the end of a plug 8. The plug is preferably mounted in the wall of the housing substantially as shown. It will be noted from this construction that the outer race-way is positively locked against rotary creeping regardless of the speed of the shaft, but that by virtue of the slot 7 said race-way may move slightly in a longitudinal direction within the housing to thereby compensate for thrusts encountered by said shaft.

Figure 1:
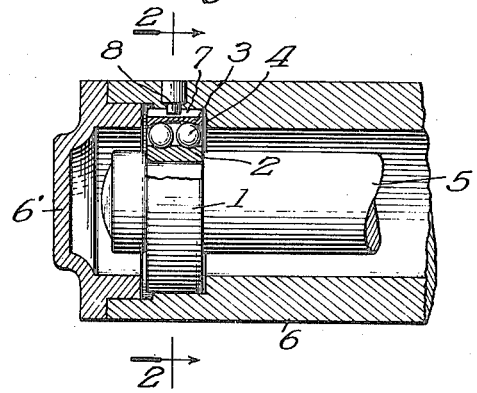
Figure 1 is a vertical longitudinal sectional view of a bearing mounted in accordance with the present invention.
Figure 4:
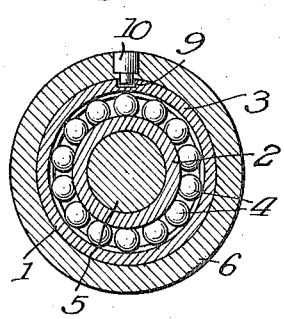
Figs. 3 and 4 illustrate a slightly modified form of the invention.
Figure 3:
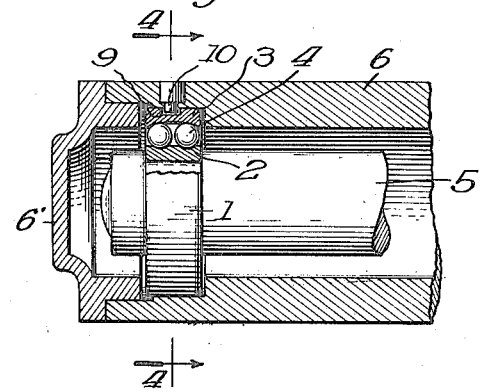

In Figs. 3 and 4 a slightly modified form of the invention is illustrated. In this embodiment the outer race-way is provided with a cylindrical recess 9 instead of a slot such as shown in the preferred form, said recess being adapted to receive the end of the plug 10 corresponding to the plug 8 shown in Figs. 1 and 2. It is obvious that various other means may be devised to prevent rotary creeping of the outer race-way and applicant desires therefore to cover such changes and modifications in the construction shown as fall within the scope of the appended claim.

Having thus described my invention, what I claim as new and desire to secure by Letters Patent of the United States is:—

The combination with a unitary structure comprising inner and outer race-ways having bearings interposed therebetween, of a housing for said unitary structure, a slot in the outer race-way of said unitary structure, and means carried by said housing projecting into said slot to prevent said outer race-way from creeping in a rotary direction within said housing, but permitting the same to move in a longitudinal direction therein.

In witness whereof, I hereunto subscribe my name this 28th day of July, A. D. 1917.

CHESTER H. BEACH.